United States Patent
Wang et al.

(10) Patent No.: US 10,466,753 B2
(45) Date of Patent: Nov. 5, 2019

(54) RESETTING SYSTEM REGISTERS POWERED BY INDEPENDENT POWER SOURCE

(71) Applicant: DELL PRODUCTS, L.P., Round Rock, TX (US)

(72) Inventors: Isaac Q. Wang, Austin, TX (US); Vinh B. Lu, Austin, TX (US); Johan Rahardjo, Austin, TX (US)

(73) Assignee: Dell Products, L.P., Round Rock, TX (US)

( * ) Notice: Subject to any disclaimer, the term of this patent is extended or adjusted under 35 U.S.C. 154(b) by 259 days.

(21) Appl. No.: 15/674,049

(22) Filed: Aug. 10, 2017

(65) Prior Publication Data

US 2019/0050034 A1  Feb. 14, 2019

(51) Int. Cl.

| | | |
|---|---|---|
| G06F 11/00 | (2006.01) | |
| G06F 1/24 | (2006.01) | |
| G06F 1/14 | (2006.01) | |
| G06F 3/06 | (2006.01) | |
| G06F 1/324 | (2019.01) | |
| G06F 1/26 | (2006.01) | |
| G06F 9/4401 | (2018.01) | |
| G06F 1/3203 | (2019.01) | |

(52) U.S. Cl.
CPC .......... *G06F 1/24* (2013.01); *G06F 1/14* (2013.01); *G06F 1/263* (2013.01); *G06F 1/266* (2013.01); *G06F 1/324* (2013.01); *G06F 3/065* (2013.01); *G06F 3/0619* (2013.01); *G06F 3/0679* (2013.01); *G06F 1/3203* (2013.01); *G06F 9/4401* (2013.01)

(58) Field of Classification Search
CPC combination set(s) only.
See application file for complete search history.

(56) References Cited

U.S. PATENT DOCUMENTS

| | | | | |
|---|---|---|---|---|
| 6,253,319 B1 * | 6/2001 | Tran | .......................... | G06F 1/26 |
| | | | | 713/1 |
| 7,003,655 B2 * | 2/2006 | Wang | ........................ | G06F 1/24 |
| | | | | 713/1 |
| 7,197,657 B1 * | 3/2007 | Tobias | ....................... | G06F 1/14 |
| | | | | 713/400 |
| 8,230,206 B2 * | 7/2012 | Cheng | ....................... | G06F 8/60 |
| | | | | 713/1 |
| 8,850,175 B2 | 9/2014 | Cheng et al. | | |

(Continued)

*Primary Examiner* — Michael Maskulinski
(74) *Attorney, Agent, or Firm* — Isidore PLLC

(57) ABSTRACT

A method and information handling system (IHS) resets one or more system registers of the IHS. The method includes receiving, by the IHS, a system register reset request. In response to receiving the system register reset request, an auxiliary power disable signal is sent to an auxiliary power source and a system register reset enable signal is sent to a register reset controller. The method further includes disabling, by the auxiliary power source, an auxiliary power source output in response to receiving the auxiliary power disable signal. The method further includes disabling, by the register reset controller, a system register power source in response to receiving the system register reset enable signal. The method further resets the one or more system registers to one or more default values in response to detecting that the auxiliary power source output and the system register power source are disabled.

20 Claims, 11 Drawing Sheets

(56) References Cited

U.S. PATENT DOCUMENTS

2013/0147541 A1* 6/2013 Zhou ..................... G06F 1/24
   327/437
2018/0121277 A1* 5/2018 Dougherty ............... G11C 7/02

\* cited by examiner

RESETTING SYSTEM REGISTERS POWERED BY INDEPENDENT POWER SOURCE

BACKGROUND

Technical Field

The present disclosure generally relates to an information handling system and in particular to resetting system registers in an information handling system that are powered by an independent power source.

Description of the Related Art

As the value and use of information continue to increase, individuals and businesses seek additional ways to process and store information. One option available to users is information handling systems. An information handling system generally processes, compiles, stores, and/or communicates information or data for business, personal, or other purposes, thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Information handling systems may contain a set of system registers that can be powered by a power source independent of the main power source used by the information handling system. The independent power source frequently takes the form of a small battery or other electronic component that can store a charge. By using an independent power source, the system registers can maintain the data stored in them even if the information handling system is disconnected from all external power sources. In some instances, the data in the system registers can get corrupted, which, in turn, may prevent the information handling system from booting. Because the system registers are powered by an independent power source, the system registers typically cannot be reset by removing all external power sources. Thus, to reset the system registers in some instances, the information handling system must be opened and the independent power source manually disconnected. For many uses of information handling systems, like those located in a data center and/or those that are primarily managed remotely, manually disconnecting the independent power source can result in numerous issues. For example, the information handling system may be completely unusable until the independent power source is disconnected and the registers reset. Additionally, there may be significant time required and a non-negligible cost associated with sending a technician to complete the reset.

BRIEF SUMMARY

Disclosed are a computer-implemented method and an information handling system (IHS) for autonomously resetting system registers in an IHS when the registers are powered by an independent power source and cannot be reset by simply removing the main system power. The method includes receiving, by the IHS, a system register reset request. In response to receiving the system register reset request, an auxiliary power disable signal is sent to an auxiliary power source and a system register reset enable signal is sent to a register reset controller. The method further includes disabling, by the auxiliary power source, an auxiliary power source output in response to receiving the auxiliary power disable signal. The auxiliary power source output provides primary power for one or more system registers. The method further includes disabling, by the register reset controller, a system register power source in response to receiving the system register reset enable signal. The system register power source provides backup power for the one or more system registers. The method further resets the one or more system registers to one or more default values in response to detecting that the auxiliary power source output and the system register power source are disabled. Each of the default values corresponds to at least one system register of the one or more system registers.

According to another embodiment, the IHS comprises a first timing circuit configured to receive a system register reset trigger signal and, in response to receiving the system register reset trigger signal, send an auxiliary power source disable signal to an auxiliary power source to temporarily disable the auxiliary power source. The IHS further comprises a second timing circuit configured to receive the system register reset trigger signal and, in response to receiving the system register reset trigger signal, send a system register reset enable signal to a register reset circuit. The IHS further comprises a register reset circuit configured to receive the system register reset enable signal from the second timing circuit and, in response to receiving the system register reset enable signal, send, to a first component, a system register reset signal to reset one or more system registers. The IHS further comprises the first component, the first component being configured to receive the system register reset signal and, in response to receiving the system register reset signal, reset the one or more system registers to a default state.

According to another embodiment, the IHS comprises a set of one or more system registers, a timer, and a controller communicatively coupled to the timer and having firmware executing thereon. The firmware configures the controller to receive a system register reset request and, in response to receiving the system register reset request, send a system register reset trigger signal to the timer. The timer is configured to receive the system register reset trigger signal. The timer is further configured to, in response to receiving the register system reset trigger signal, send a first power source disable signal to a first power source and send a second power source disable signal to a second power source. Disabling the first power source and the second power source resets the one or more system registers.

The above presents a general summary of several aspects of the disclosure in order to provide a basic understanding of at least some aspects of the disclosure. The above summary contains simplifications, generalizations and omissions of detail and is not intended as a comprehensive description of the claimed subject matter but, rather, is intended to provide a brief overview of some of the functionality associated therewith. The summary is not intended to delineate the scope of the claims, and the summary merely presents some concepts of the disclosure in a general form as a prelude to the more detailed description that follows. Other systems, methods, functionality, features and advantages of the claimed subject matter will be or will become apparent to one with skill in the art upon examination of the following figures and detailed written description.

BRIEF DESCRIPTION OF THE DRAWINGS

The description of the illustrative embodiments can be read in conjunction with the accompanying figures. It will be appreciated that for simplicity and clarity of illustration, elements illustrated in the figures have not necessarily been drawn to scale. For example, the dimensions of some of the elements are exaggerated relative to other elements. Embodiments incorporating teachings of the present disclosure are shown and described with respect to the figures presented herein, in which.

DETAILED DESCRIPTION

Figure 1:
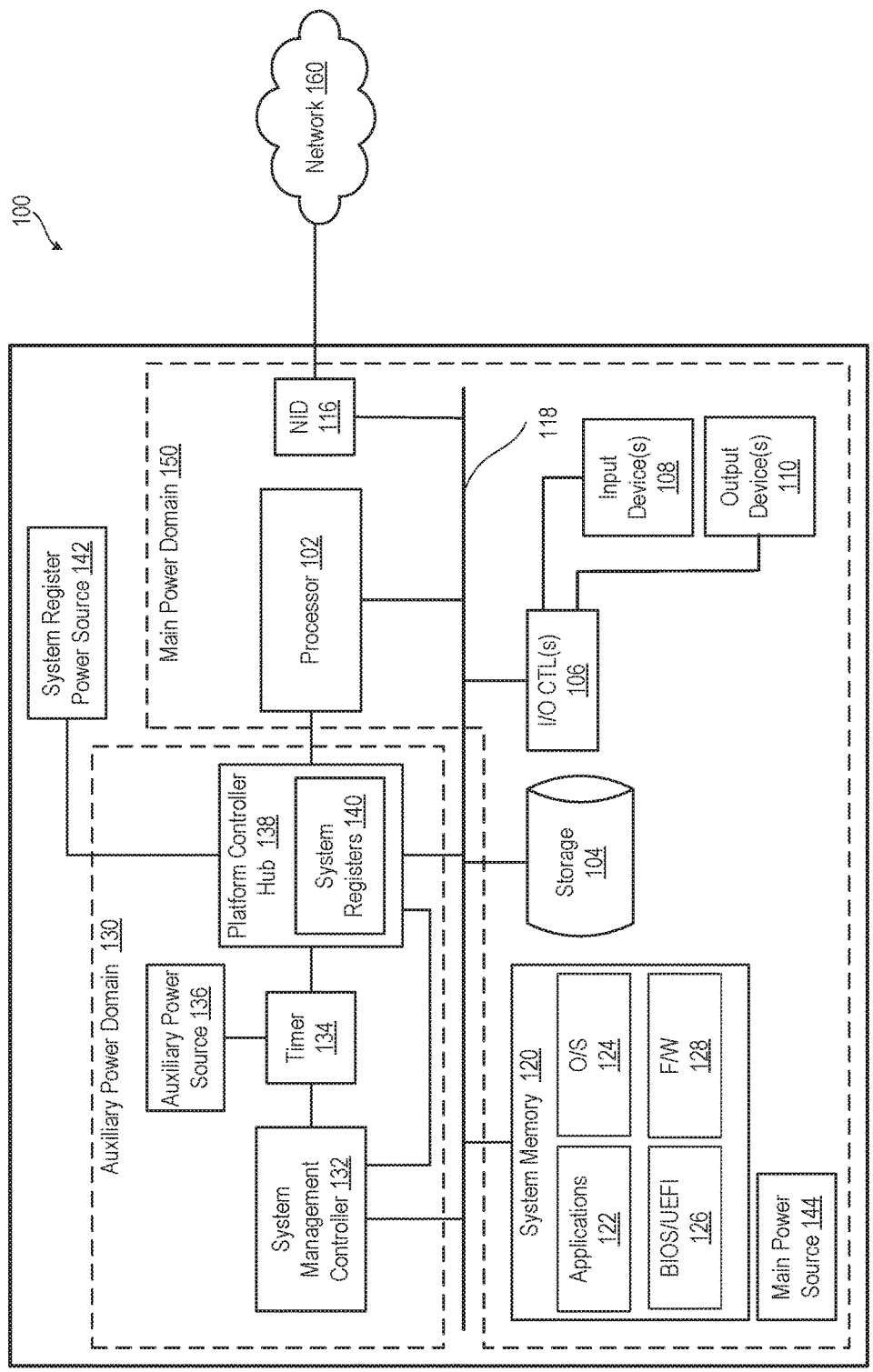
FIG. 1 illustrates an example information handling system within which various aspects of the disclosure can be implemented, according to one or more embodiments.

The illustrative embodiments provide an information handling system (IHS) and a method performed within the information handling system for resetting one or more system registers of the IHS. The system registers are powered by an independent power source that is not reliant on a power source external to the IHS. The method includes the IHS receiving a system register request. The system register request may be received from any component or device that is communicatively coupled with the IHS (including components or devices that are part of the IHS). The method further includes sending an auxiliary power disable signal to an auxiliary power source and sending a system register reset enable signal to a register reset controller. An auxiliary power source output is disabled by the auxiliary power source in response to receiving the auxiliary power source disable signal. A system register power source is disabled by the register reset controller in response to receiving the system register reset enable signal. When the auxiliary power source output and the system register power source are disabled, the one or more system registers are reset to default values.

In the following detailed description of exemplary embodiments of the disclosure, specific exemplary embodiments in which the disclosure may be practiced are described in sufficient detail to enable those skilled in the art to practice the disclosed embodiments. For example, specific details such as specific method orders, structures, elements, and connections have been presented herein. However, it is to be understood that the specific details presented need not be utilized to practice embodiments of the present disclosure. It is also to be understood that other embodiments may be utilized and that logical, architectural, programmatic, mechanical, electrical and other changes may be made without departing from general scope of the disclosure. The following detailed description is, therefore, not to be taken in a limiting sense, and the scope of the present disclosure is defined by the appended claims and equivalents thereof.

References within the specification to "one embodiment," "an embodiment," "embodiments", or "one or more embodiments" are intended to indicate that a particular feature, structure, or characteristic described in connection with the embodiment is included in at least one embodiment of the present disclosure. The appearance of such phrases in various places within the specification are not necessarily all referring to the same embodiment, nor are separate or alternative embodiments mutually exclusive of other embodiments. Further, various features are described which may be exhibited by some embodiments and not by others. Similarly, various requirements are described which may be requirements for some embodiments but not other embodiments.

It is understood that the use of specific component, device and/or parameter names and/or corresponding acronyms thereof, such as those of the executing utility, logic, and/or firmware described herein, are for example only and not meant to imply any limitations on the described embodiments. The embodiments may thus be described with different nomenclature and/or terminology utilized to describe the components, devices, parameters, methods and/or functions herein, without limitation. References to any specific protocol or proprietary name in describing one or more elements, features or concepts of the embodiments are provided solely as examples of one implementation, and such references do not limit the extension of the claimed embodiments to embodiments in which different element, feature, protocol, or concept names are utilized. Thus, each term utilized herein is to be given its broadest interpretation given the context in which that terms is utilized.

Those of ordinary skill in the art will appreciate that the hardware, firmware/software utility, and software components and basic configuration thereof depicted in the following figures may vary. For example, the illustrative components of IHS 100 are not intended to be exhaustive, but rather are representative to highlight some of the components that are utilized to implement certain of the described embodiments. For example, different configurations of an IHS may be provided, containing other devices/components, which may be used in addition to or in place of the hardware depicted, and may be differently configured. The depicted example is not meant to imply architectural or other limitations with respect to the presently described embodiments and/or the general invention.

FIG. 1 illustrates a block diagram representation of an example information handling system (IHS) 100, within which one or more of the described features of the various embodiments of the disclosure can be implemented. For purposes of this disclosure, an information handling system, such as IHS 100, may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a handheld device, personal computer, a server, a network storage device, or any other suitable device and may vary in size, shape, performance, functionality, and price. The information handling system may include random access memory (RAM), one or more processing resources such as a central processing unit (CPU) or hardware or software control logic, read-only memory (ROM), and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

Referring specifically to FIG. 1, example IHS 100 includes one or more processor(s) 102 coupled to system memory 120 via system interconnect 118. System interconnect 118 can be interchangeably referred to as a system bus, in one or more embodiments. Also coupled to system interconnect 118 is storage 104 within which can be stored one or more software and/or firmware modules and/or data (not specifically shown). In some embodiments, storage 104 can be a hard drive or a solid state drive. The one or more software and/or firmware modules within storage 104 can be loaded into system memory 120 during operation of IHS 100. As shown, system memory 120 can include therein a plurality of software and/or firmware modules including application(s) 122, operating system (O/S) 124, basic input/output system/unified extensible firmware interface (BIOS/UEFI) 126 and other firmware (F/W) 128. The various software and/or firmware modules have varying functionality when their corresponding program code is executed by processor(s) 102 or other processing devices within IHS 100.

IHS 100 further includes one or more input/output (I/O) controllers 106 which support connection by, and processing of signals from, one or more connected input device(s) 108, such as a keyboard, mouse, touch screen, or microphone. I/O controllers 106 also support connection to and forwarding of output signals to one or more connected output devices 110, such as a monitor or display device or audio speaker(s).

IHS 100 further comprises a network interface device (NID) 116. NID 116 enables IHS 100 to communicate and/or interface with other devices, services, and components that are located external to IHS 100. These devices, services, and components can interface with IHS 100 via an external network, such as example network 160, using one or more communication protocols. In one embodiment, a customer provisioned system/platform can comprise multiple devices located across a distributed network, and NID 116 enables IHS 100 to be connected to these other devices. Network 160 can be a local area network, wide area network, personal area network, and the like. The connection to and/or between network 160 and IHS 100 can be wired or wireless or a combination thereof. For purposes of discussion, network 160 is indicated as a single collective component for simplicity. However, it is appreciated that network 160 can comprise one or more direct connections to other devices as well as a more complex set of interconnections as can exist within a wide area network, such as the Internet.

The components of IHS 100 can be grouped based on whether the components receive power from a main power source or from an auxiliary power source. In particular, components that receive power from the main power source are part of main power domain 150 and components that receive power from the auxiliary power source are part of auxiliary power domain 130. Splitting the components into main power domain 150 and auxiliary power domain 130 allows power to the components within main power domain 150 to be disabled while the components in auxiliary power domain 130 remain powered.

In this example, auxiliary power domain 130 comprises system management controller (SMC) 132, timer 134, auxiliary power source 136, and platform controller hub 138. SMC 132 may be a single component or comprise multiple components. For example, SMC 132 may be a baseboard management controller, a complex programmable logic device, a field-programmable gate array, any other device configurable to perform the functions described herein. Additionally, some implementations may use a combination of devices to implement the functionality described herein. For example, SMC 132 may be a baseboard management controller and a complex programmable logic device working in conjunction to implement some or all of the functionality described herein.

For the purposes of simplifying the description of IHS 100, FIG. 1 depicts the components of auxiliary power domain 130 as separate from the components of main power domain 150. However, in an actual implementation, one or more of the components depicted in auxiliary power domain 130 may be combined with one or more components in main power domain 150 and/or one or more of the components depicted in main power domain 150 may be part of one or more components in auxiliary power domain 130. For example, platform controller hub 138 may be a component within processor 102. The distinction between components in main power domain 150 and auxiliary power domain 130 is thus not based on physical location but on which power source the component is coupled with.

As depicted in FIG. 1, SMC 132 is communicatively coupled with timer 134 and platform controller hub 138, and timer 134 is communicatively coupled with auxiliary power source 136 and platform controller hub 138. Platform controller hub 138 comprises a set of system registers 140 which are configured to hold data that should persist even if IHS 100 is disconnected from all external power sources. For example, system registers 140 may include real-time clock (RTC) data and/or power management data.

Like most registers, system registers 140 may lose the data stored in them when electrical power is lost. To ensure that the data stored in system registers 140 persist between system power losses, system registers 140 are powered by system register power source 142, which is independent from both main power source 144 and auxiliary power source 136. Being powered by an independent power source distinguishes system registers 140 from the general computing registers used by processor 102 or other registers used by the IHS 100, which may lose their data when one or both of main power source 144 or auxiliary power source 136 lose power. System register power source 142 may be any kind of power source that is capable of storing power without reliance on an external power source. For example, system register power source 142 may be a battery or capacitor.

In some situations, the data in system registers 140 may get corrupted. Thus, platform controller hub 138 is configured to reset system registers 140 to a default state when both auxiliary power source 136 is disabled and system register power source 142 no longer supplies power to system registers 140. Although mechanisms may exist to disable auxiliary power source 136 without physically accessing IHS 100, system register power source 142 cannot be disabled without physically accessing IHS 100 and manually disconnecting system register power source 142.

According to one aspect of the disclosure, IHS 100 provides an example implementation that allows system registers 140 to be reset without having to manually disconnecting system register power source 142. For example, an administrator on a remote device communicating with IHS 100 via network 160 may send a system register reset request 216 instead of having to send a technician out to physically disconnect system register power source 142. Similarly, IHS 100 may be configured to allow an administrator to reset system registers 140 by pressing a particular button on the outside of IHS 100. Generally speaking, any device or component capable of sending SMC 132 a message, notification, signal, etc. can be implemented to initiate a reset of system registers 140.

By moving control over the resetting of system registers 140 to SMC 132, more complex functionality can be tied to the initiation of a system register reset. For example, the data stored in system registers prior to resetting system registers 140 can be read and stored for later use (e.g., for debugging purposes), and SMC 132 can verify that system registers 140 were properly reset, etc. Because manually disconnecting system register power source 142 would almost immediately reset system registers 140, it would be difficult to otherwise implement functionality that includes reading data from system registers 140 prior to the reset. Further, by maintaining control over the system register reset process, SMC 132 can perform various operations to ensure that the components of IHS 100 adhere to power management specifications (e.g., power state progression). If system register power source 142 is manually disconnected, SMC 132 cannot control the operations performed prior to the disconnection.

Figure 2:
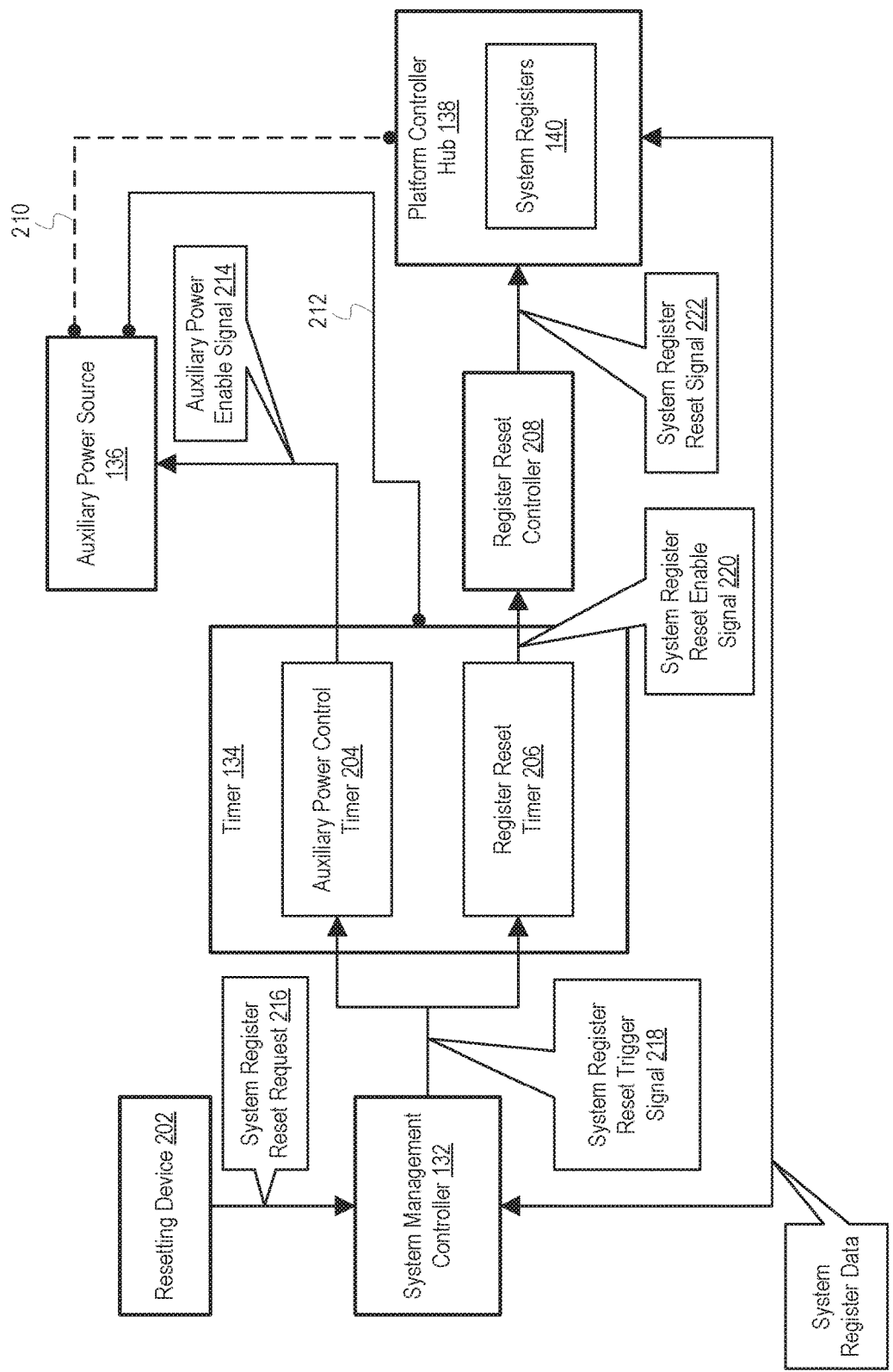
FIG. 2 is a block diagram illustrating the resetting of system registers according to one or more embodiments.

FIG. 2 is a block diagram illustrating a system for resetting system registers according to one or more embodiments. The example illustrated in FIG. 2 includes SMC 132, timer 134, auxiliary power source 136, register reset controller 208, and platform controller hub 138. Timer 134 comprises auxiliary power control timer 204 and register reset timer 206, and platform controller hub 138 comprises system registers 140. FIG. 2 also depicts the switchable power output and constant power output of auxiliary power source 136. In particular, line 210 represents a connection between a switchable power output of auxiliary power source 136 and platform controller hub 138. Similarly, line 212 represents a connection between a constant power output of auxiliary power source 136 and timer 134. FIG. 2 also depicts resetting device 202, which may be any device communicatively coupled with SMC 132. Resetting device 202 may be a device that is part of IHS 100, such as a power button or reset button. Resetting device 202 may also be a circuit or controller associated with IHS 100. For example, IHS 100 may implement functionality allowing a user to hold down the power button for a particular length of time to indicate that system registers 140 should be reset. The resetting device 202 may be a controller that receives input from the power button, detects the length of time the power button was held down, and sends a register reset request to SMC 132. In some implementations, resetting device 202 may be a remote device communicatively coupled with IHS 100 via a network (such as network 160 of FIG. 1). For example, resetting device 202 may be an administrator console or desktop computer separate from IHS 100. A user, such as an administrator, may use resetting device 202 to access management functionality implemented by IHS 100 that allows the user to specify that system registers 140 should be reset.

Auxiliary power source 136 has two power outputs, a switchable power output 210 and a constant power output 212. Auxiliary power source 136 also has an auxiliary power enable input 214. While the auxiliary power enable input 214 is asserted, auxiliary power source 136 provides power via the switchable power output. Similarly, while the auxiliary power enable input 214 is deasserted, auxiliary power source 136 does not provide power via the switchable power output. The constant power output of auxiliary power source 136 provides power regardless of whether the auxiliary power enable input 214 is asserted or not. It should be noted that the "constant" power output from auxiliary power source 136 may be enabled or disabled via a different mechanism, but the operation of such is not relevant to the subject matter discussed herein. Thus, for the purposes of the examples discussed herein, it is assumed that the power output from the auxiliary power source 136 is constant during the operations described herein.

As mentioned above, resetting device 202 sends a system register reset request 216 to SMC 132. In some instances, the system register reset request 216 may be part of, or implied by, a different type of request. For example, instead of receiving a request explicitly indicating that system registers 140 should be reset, SMC 132 may receive a request to reset IHS 100 into a particular default state that requires resetting system registers 140.

In response to receiving the system register reset request 216 from resetting device 202, SMC 132 performs one or more operations which may vary between implementations. In some implementations, SMC 132 may read the values from system registers 140 and store the current values in memory or storage associated with SMC 132. In some implementations, SMC 132 may log the reception of the system register reset request 216 and/or the current values of system registers 140. Logging the reception of the system register reset request 216 can be used for debugging purposes and/or determining that the system register reset request 216 had been received. For example, the next time SMC 132 enters a boot sequence, SMC 132 may perform particular operations if SMC 132 determines that a register reset request was previously received. SMC 132 furthers sends a system register reset trigger signal 218 to auxiliary power control timer 204 and register reset timer 206 (hereinafter "timers 204 and 206").

In some implementations, SMC 132 may enforce various requirements related to ensuring proper power management of IHS 100. For example, the Advanced Configuration and Power Interface standard (ACPI) specifies various power states. In particular, ACPI specifies G0 through G3 global states, S1 through S5 sleep states, C0 through C3 CPU states, D0 through D3 device states, and P0 through Pn performance states (an implementation specific range).

Sleep states S1 through S4 are sub-states of the G2 global state and S5 occurs when the G3 global state is active. ACPI or the particular chipset implementation may put restrictions on the various states that IHS 100 must be in before certain operations may be performed. For example, a chipset may require that IHS 100 be in an S5 state prior to transitioning to a G3 state. Thus, in response to receiving the system register reset request 216 from resetting device 202, SMC 132 may check to see if IHS 100 is in the S5 state and if not, perform one or more operations to put IHS 100 into the S5 state.

Auxiliary power control timer 204 is configured to send an auxiliary power enable signal 214 to auxiliary power source 136. When asserted (in a logic high state), the auxiliary power enable signal 214 indicates that the switchable power output of auxiliary power source 136 should be enabled, thus providing power to the components within auxiliary power domain 130, regardless of whether they are connected to the switchable or constant power outputs.

In response to receiving the system register reset trigger signal 218, auxiliary power control timer 204 is configured to deassert the auxiliary power enable signal 214, setting the auxiliary power enable signal 214 to a logic low state. When in the logic low state, the auxiliary power enable signal 214 indicates that the switchable auxiliary power output from auxiliary power source 136 should be disabled. Auxiliary power control timer 204 is configured to deassert the auxiliary power enable signal 214 (i.e., hold in a logic low state) for a particular, configured time period. Auxiliary power control timer 204 may be set to a predetermined time period based, at least in part, on the time period needed for an auxiliary power rail (which provides power to the auxiliary power domain 130) to become stable (e.g., allowing for all capacitors and other components to charge/discharge). In some implementations, the time period may be dynamically configurable. Regardless of whether the time period is predetermined or dynamically configurable, once the time period has elapsed, auxiliary power control timer 204 assets the auxiliary power enable signal 214, setting the auxiliary power enable signal 214 to a logic high state.

Register reset timer 206 is configured to deassert the system register reset enable signal 220 by default, setting the register reset enable signal to a logic low state. In response to receiving the register reset trigger signal, register reset timer 206 is configured to assert the register reset enable signal for a particular time period, setting the register reset enable signal to a logic high state. Register reset timer 206 may be set to a predetermined time period based, at least in part, on the time period needed for a system register power rail to become stable. In some implementations, the time period may be dynamically configurable. Regardless of whether the period of time is predetermined or dynamically configurable, once the time period has elapsed, register reset timer 206 deasserts the register reset enable signal, setting the register reset enable signal to a logic low state.

When register reset timer 206 asserts the system register reset enable signal 220, register reset controller 208 may assert or deassert the system register reset signal 222 depending on the implementation. More specifically, the system register reset functionality implemented in platform controller hub 138 can be implemented in a variety of ways. For example, platform controller hub 138 can be implemented to reset system registers 140 in response to receiving a logic high signal on a particular input. In some implementations, platform controller hub 138 may be configured to reset system registers 140 in response to detecting a loss of power from the system register power source 142. In such implementations, register reset controller 208 can disable the system register power source 142 to platform controller hub 138, thereby triggering the reset of system registers 140.

Once the resetting of system registers 140 has been triggered, platform controller hub 138 may write default values (e.g., values stored in a ROM or other non-volatile memory) to system registers 140 or may indicate that the current values in system registers 140 are invalid, writing the default values at a later point.

As noted above, SMC 132 may log the reception of a register reset request. At a later point, such as the next time SMC 132 is booting, SMC 132 may determine that a system register reset request 216 was received. In response to determining that a system register reset request 216 was received, SMC 132 may perform one or more operations to verify that system registers 140 were successfully reset. For example, SMC 132 may read the values from each of system registers 140 and compare the values to a set of valid values. If the value of a particular system register matches a valid value, SMC 132 may indicate (in a log, for example) that the reset of that particular system register was successful. If the value of a particular system register does not match a valid value, SMC 132 may indicate, in a log, that the reset of that particular system register was not successful.

Additionally, SMC 132 may store a set of default system register values. In such an implementation, after determining that a system register reset request 216 was received, SMC 132 may write the values associated with a particular set of default system register values to the appropriate system registers 140. When the values associated with a set of default system register values are written to system registers 140, the values may overwrite any values written to system registers 140. For example, PCH 138 may implement functionality to reset system registers 140 when system register power source 142 is disabled. By writing its own default values to system registers 140, SMC 132 may override the default values written to system registers 140 by PCH 138.

In this example, timer 134 is depicted as a single element with two embedded timers (auxiliary power control timer 204 and register reset timer 206), but the implementation can vary. As depicted, timer 134 can be implemented using a dual timer integrated circuit (e.g., a 556 timer integrated circuit). In some implementations, the auxiliary power control timer 204 and the register reset timer 206 can be implemented using separate timer integrated circuits. In some implementations, the auxiliary power control timer 204 and the register reset timer 206 can be implemented using discrete components instead of integrated circuits. Additionally, some implementations may use a combination of discrete components and integrated circuits.

Figure 3:
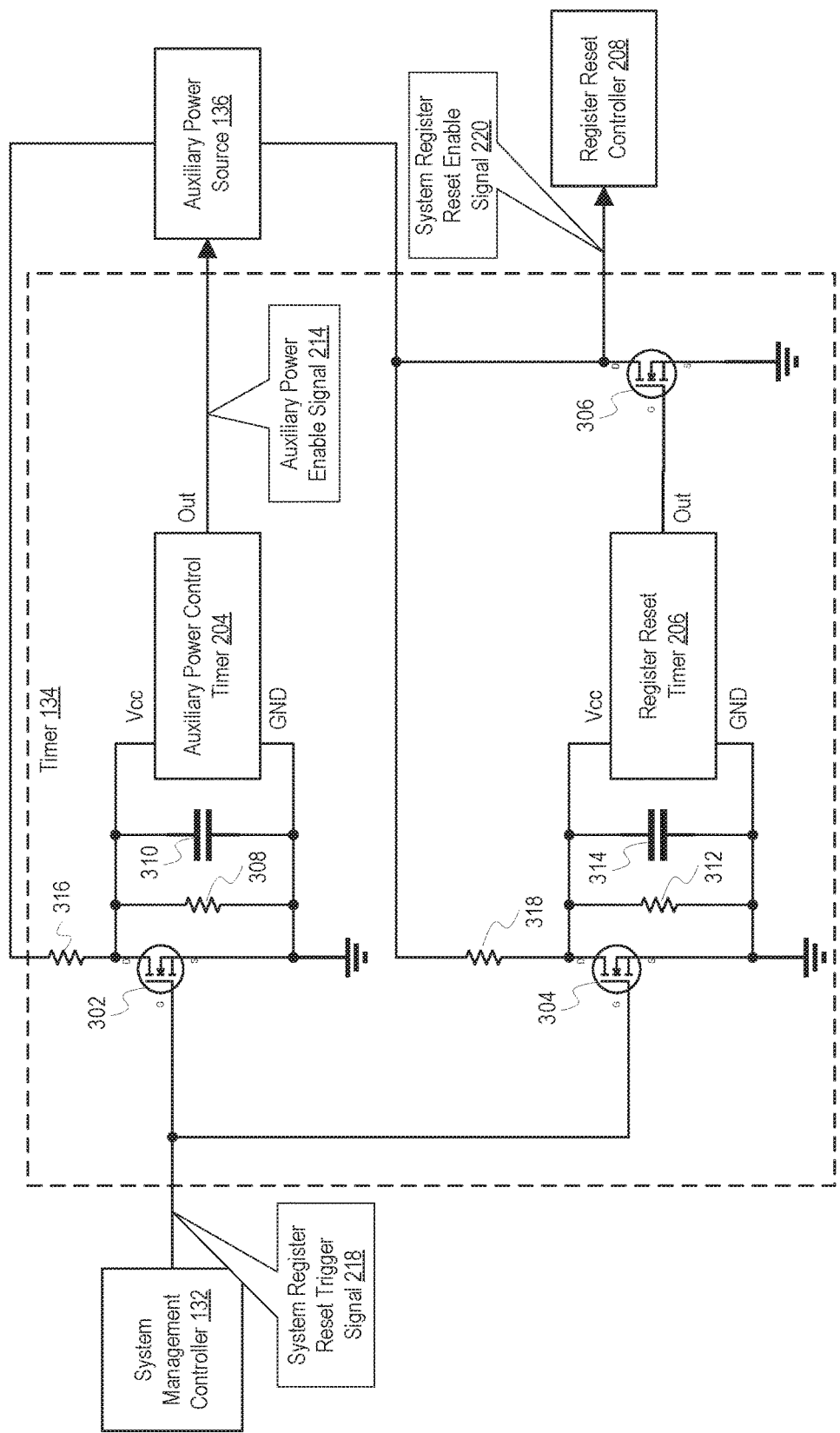
FIG. 3 illustrates the structure of a timer configured to disable an auxiliary power source and trigger a system register reset, according to one or more embodiments.

FIG. 3 illustrates the structure of a timer configured to disable an auxiliary power source and trigger a system register reset, according to one or more embodiments. The example illustrated in FIG. 3 includes SMC 132, timer 134, auxiliary power source 136, and register reset controller 208. Timer 134, as illustrated in FIGS. 2 and 3, comprises auxiliary power control timer 204 and register reset timer 206. Timer 134, as depicted in FIG. 3, additionally comprises transistors 302, 304 and 306. Transistor 302 is coupled with auxiliary power control timer 204 via a resistor-capacitor (RC) circuit comprising resistor 308 and capacitor 310 (hereinafter "RC circuit A"). Similarly, transistor 304 is coupled with register reset timer 206 via an RC circuit comprising resistor 312 and capacitor 314 (hereinafter "RC circuit B").

To avoid obfuscating the example depicted in FIG. 3, some circuit details are not depicted. For example, various pull-up and pull-down resistors may be used to ensure proper logic levels on the various inputs and outputs (e.g., pull-up resistors 316 and 318). More particularly, pull-down resistors may be used to ensure that system register reset trigger signal 218 coming from SMC 132 is logic low by default and pull-up resistors may be used to ensure that the input signals to auxiliary power control timer 204 and register reset timer 206 are logic high by default.

As depicted in this example, transistors 302, 304, and 306 are n-channel, enhancement mode MOSFETs acting as switches, although implementations can vary. Transistors 302 and 304 are configured similarly, i.e., the system register reset trigger signal 218 coming from SMC 132 is connected to the gate terminals, the drain terminals are connected to the constant power output from auxiliary power source 136, and the source terminals are connected to ground. Transistor 306 is configured similarly to transistors 302 and 304, except the gate terminal is connected to the register reset timer 206 output.

In operation, transistors 302 and 304 serve a similar purpose, acting as a switch, depending on the logic level of the system register reset trigger signal 218. When the register reset signal is logic low (e.g., when not asserted by SMC 132), transistors 302 and 304 act as open switches, resulting in a positive voltage from the auxiliary power source 136 being applied to the inputs (Vcc) of timers 204 and 206. When SMC 132 asserts the register reset signal, resulting in a logic high level, transistors 302 and 304 act as closed switches, resulting in the voltage applied to the inputs of timers 204 and 206 dropping to zero volts (or near zero in an actual implementation).

By default, timers 204 and 206 output a positive voltage if the respective input is supplied a positive voltage. When SMC 132 asserts the system register reset trigger signal 218, allowing current to flow through transistors 302 and 304 and causing the input voltage to timers 204 and 206 to drop to zero, timers 204 and 206 are both triggered. Once triggered, timers 204 and 206 drop their output voltages to zero, effectively deasserting the corresponding signal. The timers 204 and 206 hold their output voltages low for the time periods configured, as described above.

The output of auxiliary power control timer 204 is the auxiliary power enable signal 214, which serves as an input to auxiliary power source 136. Auxiliary power source 136 disables the switchable power output of auxiliary power source 136 in response to deassertion of the auxiliary power enable signal 214. As noted above, transistors 302, 304, and 306 are connected to the constant power output from auxiliary power source 136, and are thus unaffected by the assertion or deassertion of the auxiliary power enable signal 214.

The output of register reset timer 206 serves as the input to the gate terminal of transistor 306. The output of transistor 306 serves as the register reset enable signal. Transistor 306 acts as a switch similar to transistors 302 and 304. However, as noted above, the output of register reset timer 206 defaults to a positive voltage. As such, transistor 306 allows current to flow through by default, resulting in zero volts coming from transistor 306, effectively deasserting the register reset enable signal. In other words, transistor 306 negates the output of register reset timer 206. When register reset timer 206 is triggered (in response to assertion of the register reset signal), the output of register reset timer 206 drops to zero volts for the configured time period. While the output of register reset timer 206 is zero volts, current does not flow through transistor 306, resulting in a positive voltage coming from transistor 306, effectively causing the register reset enable signal to be asserted.

RC circuit A and RC circuit B can be used to introduce a delay between the assertion of the system register reset trigger signal 218 and the actual triggering of timers 204 and 206. For example, a chipset specification may indicate that the system register reset signal 222 should only be asserted after the switchable output of auxiliary power source 136 has been disabled and become stable. Because register reset timer 206 asserts the system register reset enable signal 220 as soon as it receives the system register reset trigger signal 218, the system register reset signal 222 may get asserted before the switchable output of auxiliary power source 136 has been disabled and become stable. However, because the voltage to the Vcc input of register reset timer 206 will not be depleted sufficiently to trigger register reset timer 206 until capacitor 314 has sufficiently discharged, RC circuit B prevents the system register reset trigger signal 218 from triggering register reset timer 206 immediately. RC circuit A can similarly delay the triggering of auxiliary power control timer 204. The particular configurations of RC circuit A and RC circuit B can be varied depending on the desired delay. For example, to increase the delay for RC circuit A, the size of capacitor 310 may be increased and to decrease the delay for RC circuit A, the size of capacitor 310 may be decreased. Similarly, to increase the delay for RC circuit B, the size of capacitor 314 may be increased and to decrease the delay for RC circuit B, the size of capacitor 314 may be decreased. If no delay is desired, one or both of RC circuit A and RC circuit B may be excluded from the design. Further, different mechanisms to introduce a delay may be used in place of RC circuit A and/or RC circuit B. For example, a time delay integrated circuit may be used.

Figure 4:
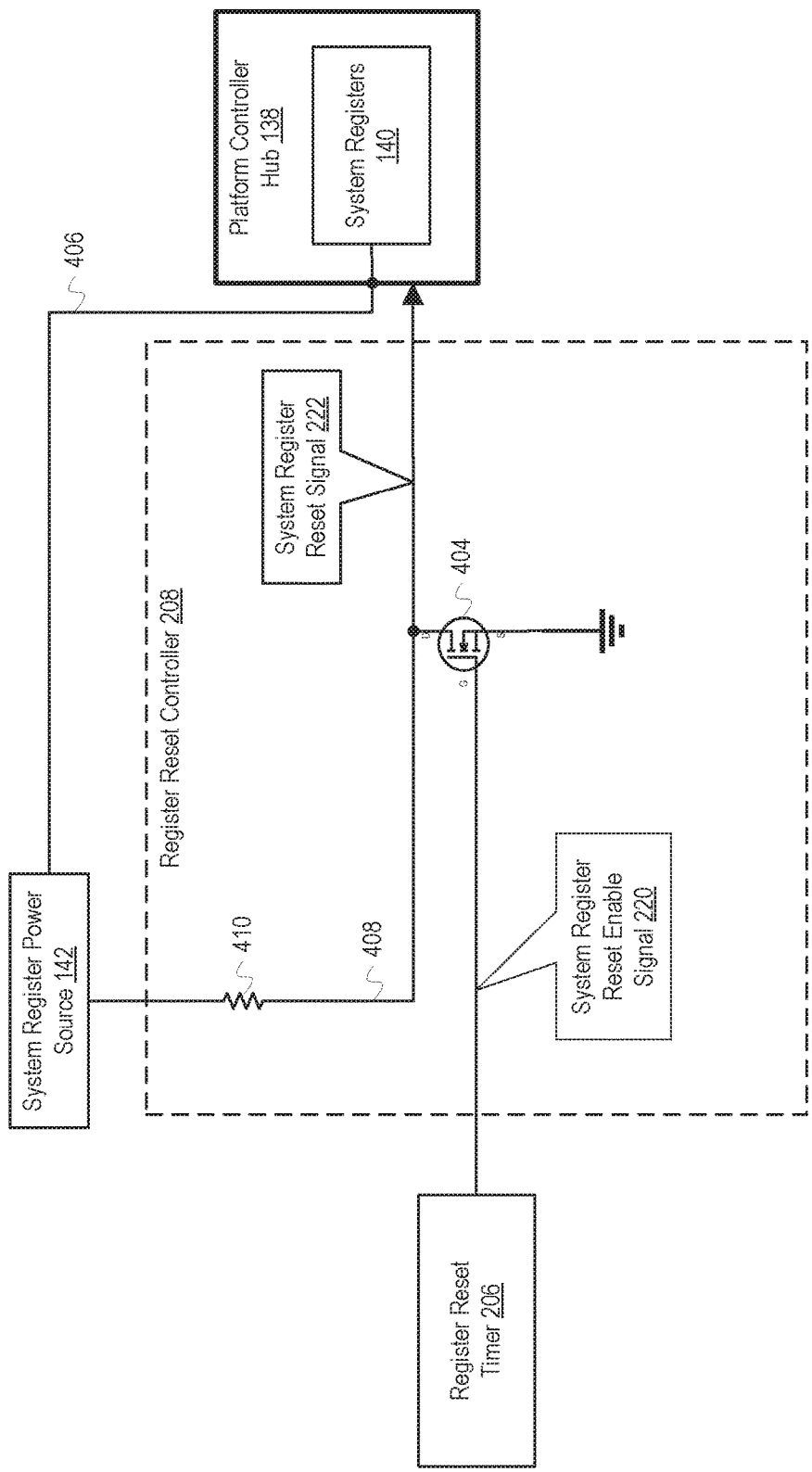
FIG. 4 illustrates the structure of a register reset controller configured to reset system registers via a system register reset input of a platform controller hub, according to one or more embodiments.
Figure 5:
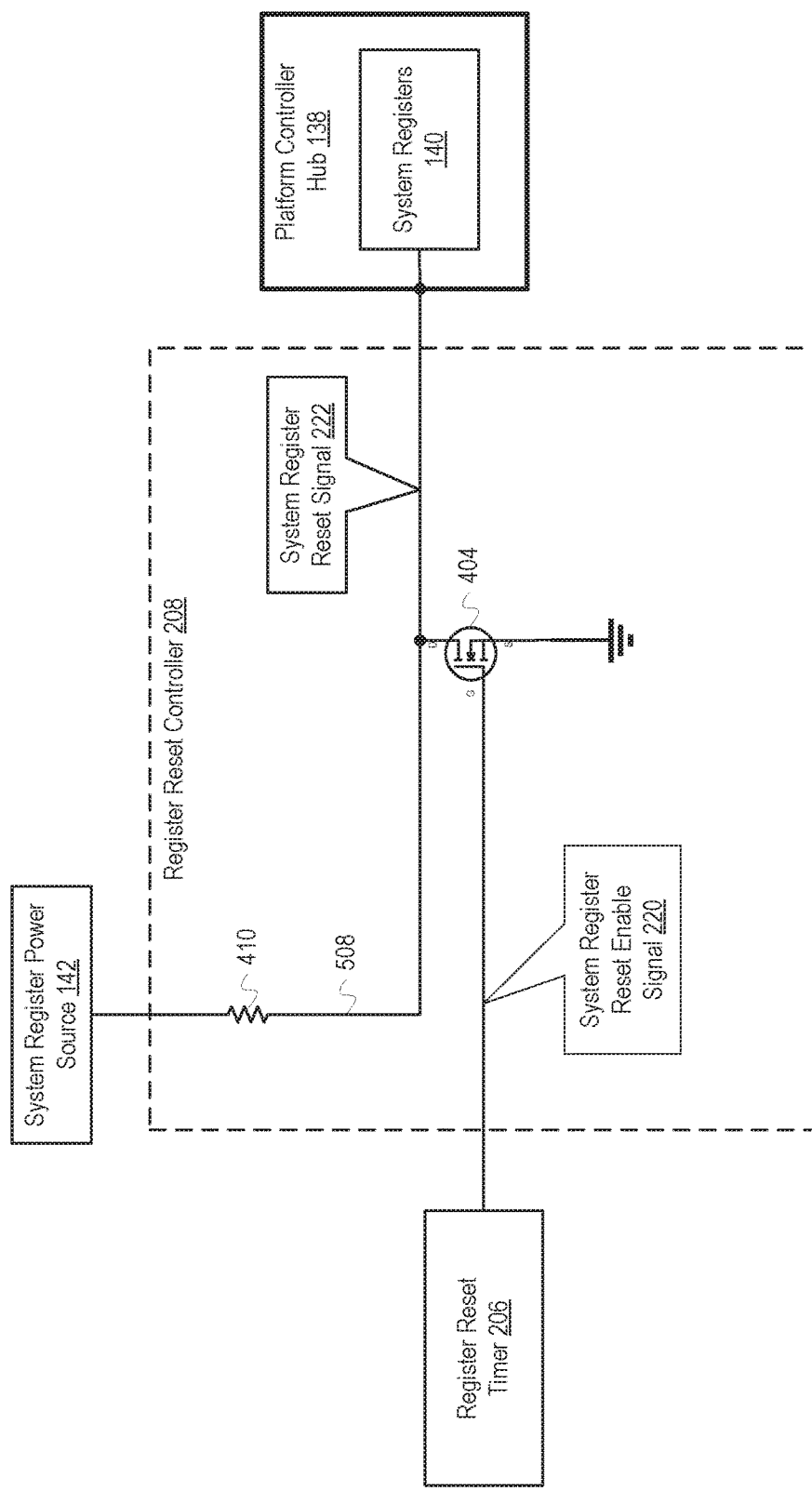
FIG. 5 illustrates the structure of a register reset controller configured to reset system registers by disabling the power source for the system registers, according to one or more embodiments.

FIGS. 4 and 5 illustrate two different platform controller hub 138 and register reset controller 208 configurations. In both FIGS. 4 and 5, system registers 140 are powered by system register power source 142. In FIG. 4, platform controller hub 138 is configured to reset system registers 140 when a signal is sent to a system register reset input. More particularly, when the system register reset signal 222 is set to logic low, platform controller hub 138 resets system registers 140. In FIG. 5, platform controller hub 138 does not include a specific input for resetting system registers 140, instead resetting system registers 140 when power from system register power source 142 is disabled.

To avoid obfuscating the examples in FIGS. 4 and 5, some circuit details are not depicted. For example, system register power source 142 may be coupled with transistor 404 and platform controller hub 138 via an RC circuit. Similarly, one or more pull-down or pull-up resistors may be used (e.g., pull-up resistor 410). System register power source 142 may be a battery or any other power source that can supply power to system registers 140 in the absence of external power to IHS 100.

FIG. 4 illustrates the structure of a register reset controller configured to reset system registers 140 via a system register reset input of platform controller hub 138, according to one or more embodiments. The example illustrated in FIG. 4 includes register reset timer 206, register reset controller 208, platform controller hub 138, and system register power source 142. Platform controller hub 138 comprises system registers 140. System register power source 142 provides power to system registers 140 via line 406 and provides a logic high signal to a system register reset input of platform controller hub 138 via line 408. In this example, the system register reset input of platform controller hub 138 is active low (thus the voltage to the system register reset input is pulled low to assert the system register reset signal 222). As depicted in FIG. 4, register reset controller 208 additionally comprises transistor 404.

As depicted in this example, transistor 404 is an n-channel, enhancement mode MOSFET acting as a switch, although implementations can vary. The gate, drain, and source terminals of transistor 404 are connected to the register reset enable signal output from register reset timer 206, system register power source 142, and ground, respectively.

In operation, transistor 404 acts as a switch depending on the logic level of the system register reset enable signal 220. When the system register reset enable signal 220 is logic low, transistor 404 acts as an open switch, allowing system register power source 142 to deassert the system register reset signal 222 via line 408. When the system register reset enable signal 220 is logic high, transistor 404 acts as a closed switch, causing the voltage applied to the input of platform controller hub 138 via line 408 to drop to zero (or near zero in an actual implementation), thus asserting the system register reset signal 222 and triggering the platform controller hub 138 to reset system registers 140.

FIG. 5 illustrates the structure of a register reset controller configured to reset system registers 140 by disabling the power source for the system registers 140, according to one or more embodiments. The example illustrated in FIG. 5 includes register reset timer 206, register reset controller 208, platform controller hub 138, and system register power source 142. Platform controller hub 138 comprises system registers 140. System register power source 142 provides power to system registers 140 via line 508. As depicted in FIG. 5, register reset controller 208 additionally comprises transistor 404.

As in the example depicted in FIG. 4, transistor 404 is an n-channel, enhancement mode MOSFET acting as a switch, although implementations can vary. The gate, drain, and source terminals of transistor 404 are connected to the register reset enable signal output from register reset timer 206, system register power source 142, and ground, respectively.

In operation, transistor 404 acts as a switch depending on the logic level of the system register reset enable signal 220. When the system register reset enable signal 220 is logic low, transistor 404 acts as an open switch, allowing system register power source 142 to provide power to the system registers 140 via line 508. When the system register reset enable signal 220 is logic high, transistor 404 acts as a closed switch, causing the voltage supplied to system registers 140 via line 508 to drop to zero (or near zero in an actual implementation), thus removing the power source of system registers 140 and triggering platform controller hub 138 to reset system registers 140.

Figure 6:
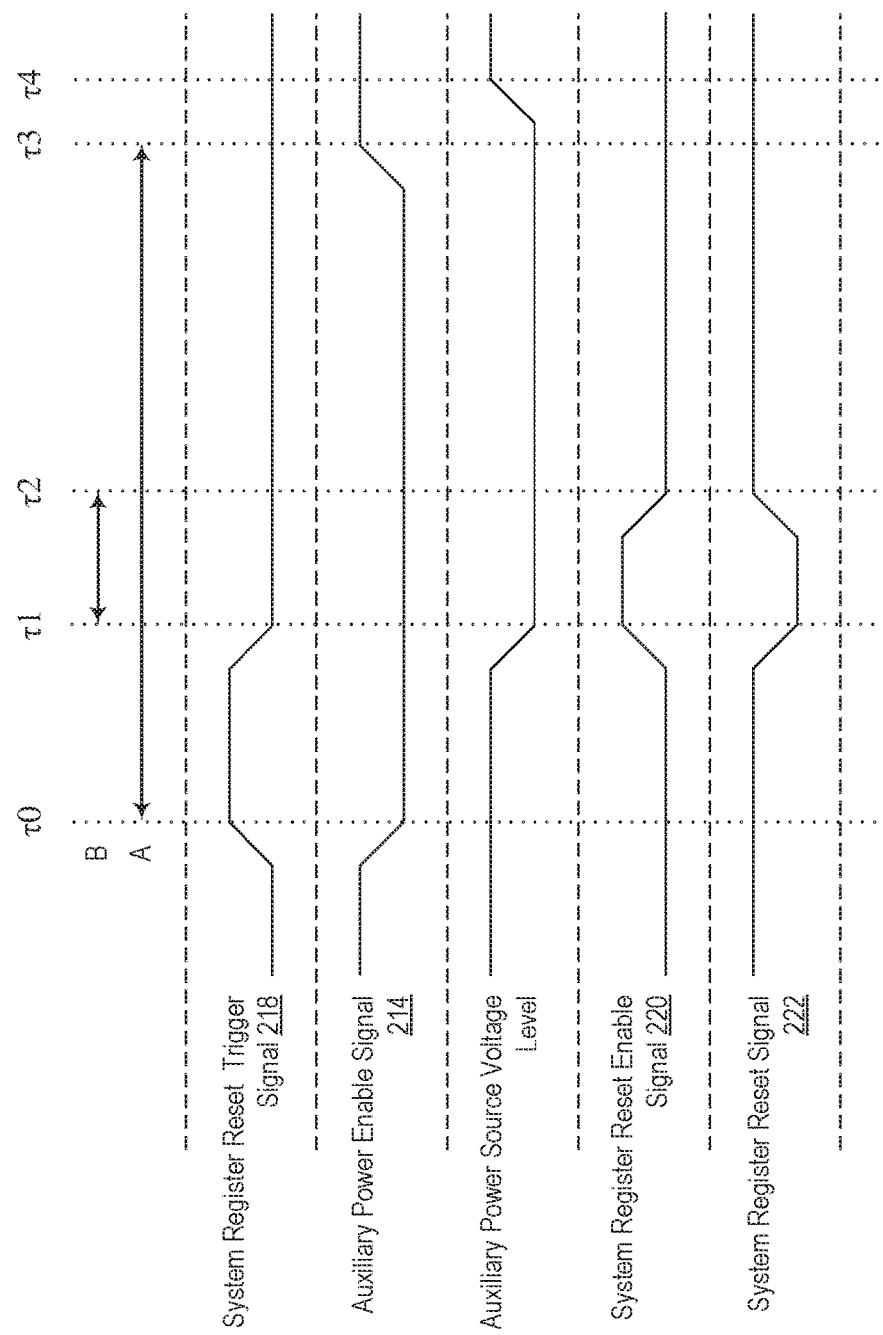
FIG. 6 is a timing diagram illustrating example logic/voltage levels of the signals and power sources discussed herein, according to one or more embodiments.

FIG. 6 is a timing diagram illustrating example logic/voltage levels of the various signals and power sources discussed herein, according to one or more embodiments. FIG. 6 illustrates the logic level (low/high) of the system register reset trigger signal 218, auxiliary power enable signal 214, system register reset enable signal 220, and system register reset signal 222. FIG. 6 also illustrates the voltage level of auxiliary power source 136.

At time τ0, SMC 132 asserts the system register reset trigger signal 218, resulting in the system register reset trigger signal 218 being set to logic high. In response to the system register reset trigger signal 218 being asserted, auxiliary power control timer 204 deasserts the auxiliary power enable signal 214, resulting in the auxiliary power enable signal 214 being set to logic low.

At time τ1, the voltage level of auxiliary power source 136 falls to zero and register reset timer 206 asserts the system register reset enable signal 220, resulting in the system register reset enable signal 220 being set to logic high. In response to the system register reset enable signal 220 being set to logic high, the register reset controller 208 asserts the system register reset signal 222. The delay between the deassertion of the auxiliary power enable signal 214 at τ0 and the voltage level of auxiliary power source 136 falling to zero can be caused by the discharging of various components, such as capacitors. The delay between the assertion of the system register reset trigger signal 218 at τ0 and the assertion of the system register reset enable signal 220 can be caused by the introduction of a delay between the SMC 132 and the register reset timer 206 by RC circuit B (resistor 312 and capacitor 314) or other delay mechanism. The specific length of delay between τ0 and τ1 can vary between implementations.

Additionally, at τ1, SMC 132 deasserts the system register reset trigger signal 218. In some implementations, SMC 132 may not explicitly perform operations to deassert the system register reset trigger signal 218. For example, if SMC 132 is powered by auxiliary power source 136, SMC 132 may lose power when the switchable power output of auxiliary power source 136 is disabled, thus causing the system register reset trigger signal 218 to be deasserted because SMC 132 no longer can assert the system register reset trigger signal 218.

At τ2, register reset timer 206 deasserts the system register reset enable signal 220, causing register reset controller 208 to deassert the system register reset signal 222. The time period between τ1 and τ2, denoted by 'B', is sufficiently long enough to allow the platform controller hub 138 to reset system registers 140. After time period B has passed, the register reset timer 206 is reset to its default state, resulting in the system register reset enable signal 220 being set to logic low and the system register reset signal 222 being set to logic high.

At τ3, the auxiliary power control timer 204 asserts the auxiliary power enable signal 214, resulting in the auxiliary power enable signal 214 being set to logic high. The time period between τ0 and τ3, denoted by 'A', is sufficiently long enough to allow the voltage level of auxiliary power source 136 and to allow the platform controller hub 138 to reset system registers 140.

At τ4, the voltage level of auxiliary power source 136 reaches the normal operating voltage. The delay between the assertion of the auxiliary power enable signal 214 at τ3 and the voltage level of auxiliary power source 136 reaching the normal operating voltage can be due to the charging of components.

Time period A may include additional time beyond the time necessary to allow the voltage level of auxiliary power source 136 to drop to zero and for the system register reset to occur. For example, a chipset specification implemented by IHS 100 may dictate that a specific amount of time should elapse between the deassertion of the system register reset enable signal 220 and the voltage level of auxiliary power source 136 reaching the normal operating voltage. As a more specific example, various Intel® specifications indicate that nine microseconds should elapse after the system register reset enable signal 220 has been deasserted before the voltage level of auxiliary power source 136 reaches normal operating voltage. Such a delay may allow various components within IHS 100 to properly transition between various power states.

Some implementations may impose a timing requirement that dictates when the auxiliary power enable signal 214 is deasserted in relation to when the system register reset trigger signal 218 is asserted. For example, the auxiliary power enable signal 214 may be deasserted at the same time as the system register reset trigger signal 218 (i.e., at τ0), generally after the system register reset trigger signal 218 has been asserted, or a specific amount of time after the system register reset trigger signal 218 was asserted. This particular delay may be configured using a delay mechanism separate from auxiliary power control timer 204, such as RC circuit A. Similarly, some implementations may impose a timing requirement that dictates when the system register reset enable signal 220 is asserted in relation to the auxiliary power enable signal 214. For example, the system register reset enable signal 220 may be asserted at the same time as the auxiliary power enable signal 214 (i.e., at τ1), generally after the auxiliary power enable signal 214 has been deasserted, or a specific amount of time after the auxiliary power enable signal 214 was asserted. This particular delay may be configured using a delay mechanism separate from register reset timer 206, such as RC circuit B. In some implementations, no delay between the assertion of the system register reset trigger signal 218 and the assertion of the system register reset enable signal 220 may be needed. In such an implementation, the system register reset enable signal 220 and the system register reset signal 222 may be asserted at τ0.

FIGS. 7 through 12 illustrate flowcharts of various exemplary methods by which IHS 100 or one or more components associated with IHS 100 can implement some or all of the features discussed herein. Although each method is described as being performed by a particular component, additional components may also perform some or all of the operations depending on the specific implementation. For example, methods 900 and 1000 are described as being performed by auxiliary power control timer 204 and register reset timer 206, respectively. However, as noted above, IHS 100 may implement the timer 134 in multiple ways that may not utilize two separate timing components. As such, timer 134 may perform the operations of both methods 900 and 1000. Similarly, because IHS 100 comprises the components described as performing methods 700, 800, 900, 1000, 1100, and 1200, IHS 100 can be described as performing some or all of the operations associated with the methods.

Figure 7:
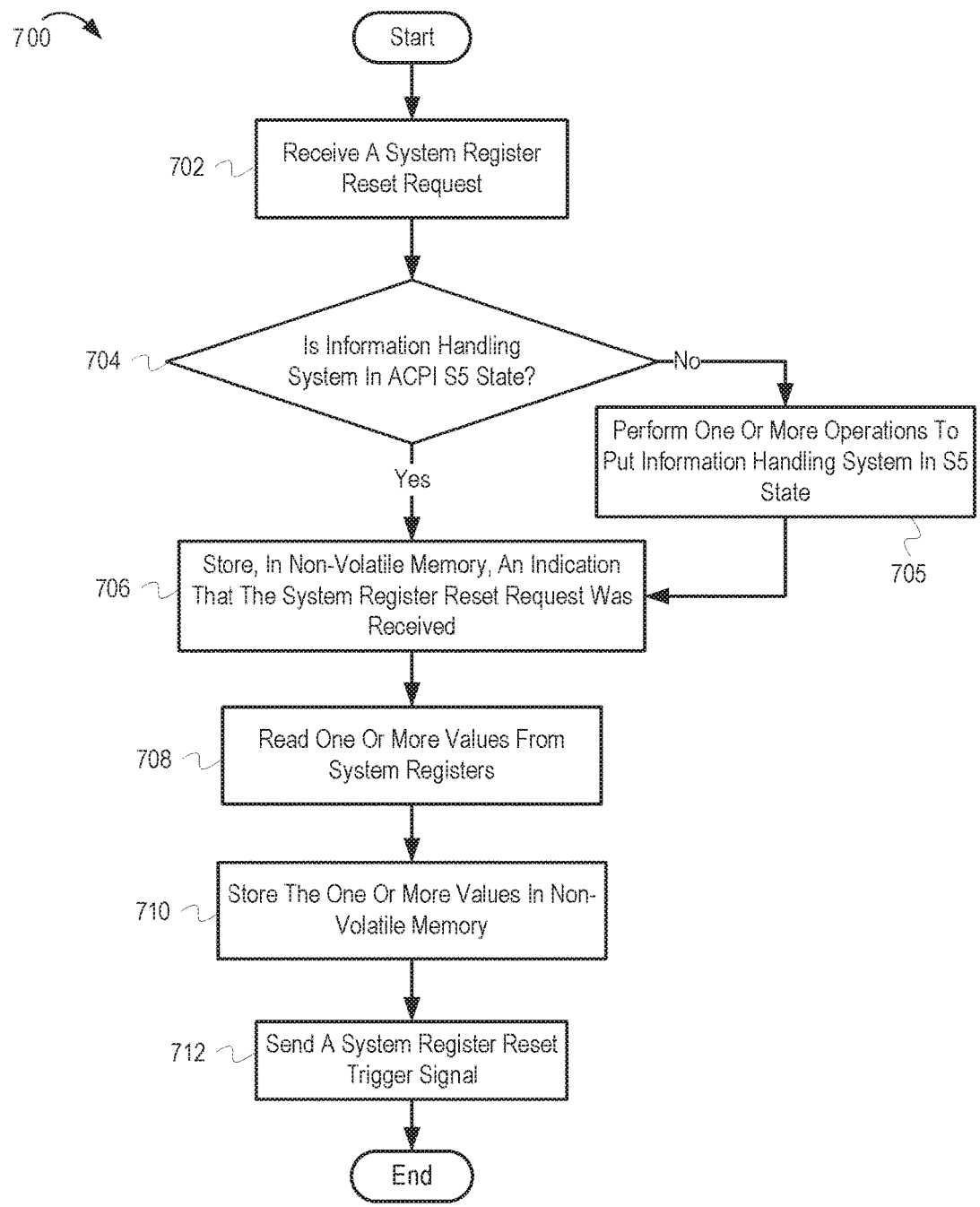
FIG. 7 illustrates a method of storing data from one or more system registers prior to performing a system register reset, according to one or more embodiments.

FIG. 7 illustrates a method 700 of storing data from one or more system registers 140 prior to performing a system register reset and ensuring that IHS 100 is in an ACPI S5 state, according to one or more embodiments. Method 700 begins when SMC 132 receives a system register reset request 216 (block 702). The system register reset request 216 can be received from any component that is communicatively coupled with SMC 132. For example, a remote administration console may send the system register reset request 216 via network 160. As another example, a button on IHS 100 may be coupled with a circuit that sends the system register reset request 216 if the button has been pressed for a particular length of time.

After receiving the system register reset request 216, SMC 132 determines whether IHS 100 is in an ACPI S5 state (decision block 704). If SMC 132 is not in the S5 state, SMC 132 performs one or more operations to put IHS 100 into the S5 state (block 705). If SMC 132 determines that IHS 100 is in the S5 state (decision block 704) or puts IHS 100 into the S5 state (block 705), SMC 132 stores, in non-volatile memory, an indication that the system register reset request 216 was received (block 706). SMC 132 reads one or more values from system registers 140, which values may include real-time clock and power management data (block 708). SMC 132 stores the one or more values read from system registers 140 in non-volatile memory (block 710). After storing the one or more values in non-volatile memory, SMC 132 sends a system register reset trigger signal 218 to timer 134 (block 712). Then method 700 ends.

Note that although the example depicted in FIG. 7 describes SMC 132 as determining whether IHS 100 is in the S5 state and, if not, putting IHS 100 into the S5 state, the particular state may vary between implementations.

Figure 8:
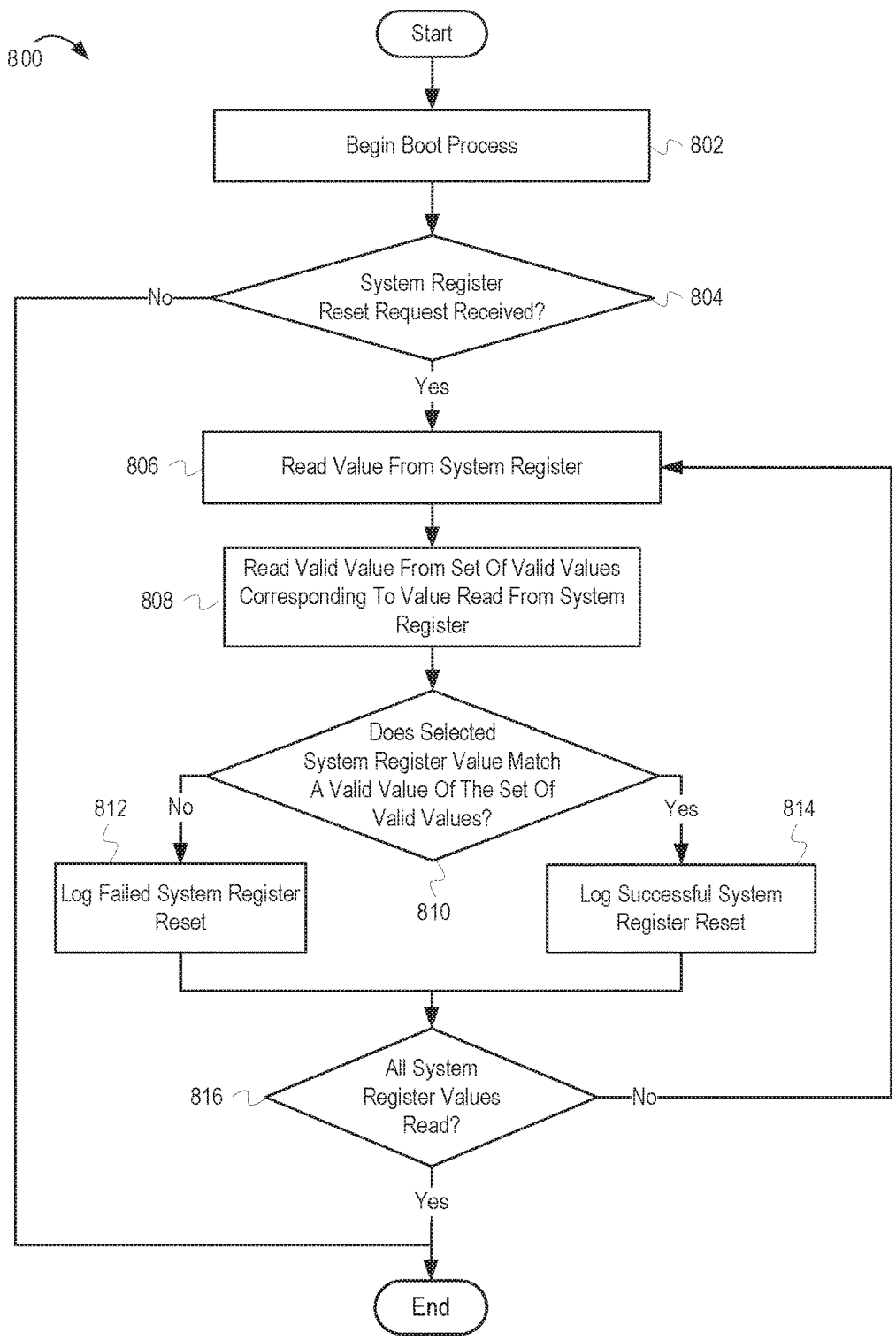
FIG. 8 illustrates a method of verifying the success or failure of resetting system registers, according to one or more embodiments.

FIG. 8 illustrates a method 800 of verifying the success or failure of resetting system registers 140, according to one or more embodiments. Method 800 begins when SMC 132 begins a boot process (block 802). SMC 132 determines whether a system register reset request 216 was received (decision block 804). If a system register reset request 216 was not received, method 800 ends. If a system register reset request 216 was received, SMC 132 reads a value from a system register of the system registers 140 (block 806). SMC 132 reads a valid value from a set of valid values corresponding to the value read from the system register (block 808). SMC 132 determines whether the value read from the system register matches a valid value of the set of valid values, which may be stored in a database of valid configurations (each containing sets of valid values for at least one of the system registers 140 (decision block 810). If the value read from the system register does not match a valid value, SMC 132 logs an indication that the reset for the selected system register failed (block 812). If the selected system register value matches a valid value, SMC 132 logs an indication that the reset for the selected system register succeeded (block 814). After logging a failed system register reset (block 812) or logging a successful system register reset (block 814), SMC 132 determines whether all system register values have been read from system registers 140 (decision block 816). If all system register values have been read from system registers 140, method 800 ends. If not all of the system register values have been read from system registers 140, method 800 proceeds back to block 806.

Note that the example depicted in FIG. 8 describes SMC 132 as reading all registers of system registers 140, but implementations can vary. For example, some of system registers 140 may not be writable, and thus SMC 132 may not read the registers that are not writeable.

Figure 9:
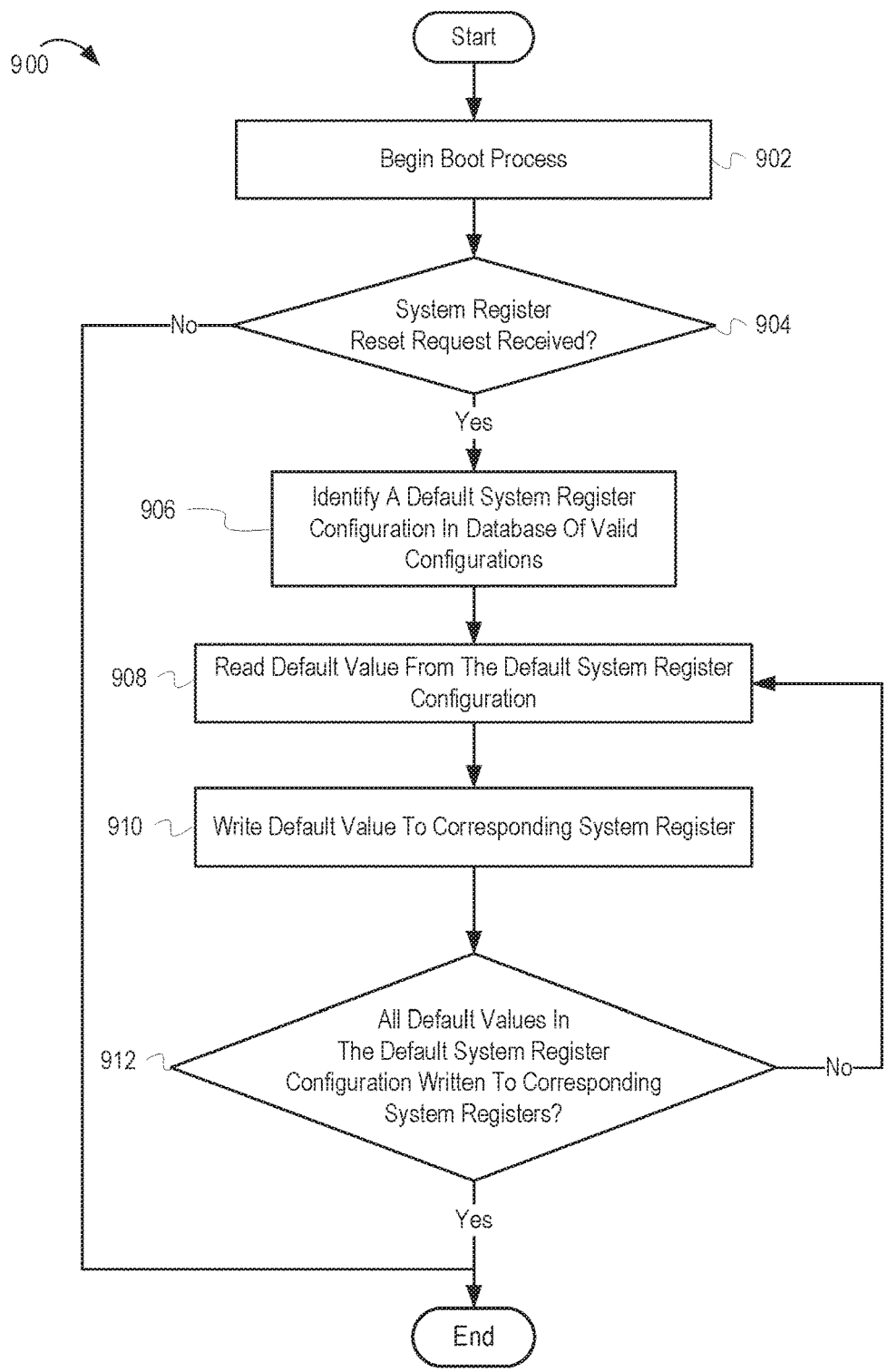
FIG. 9 illustrates a method of restoring data to system registers after the system registers have been reset, according to one or more embodiments.

FIG. 9 illustrates a method 900 of restoring data to system registers 140 after system registers 140 have been reset, according to one or more embodiments. Method 900 begins when SMC 132 begins a boot process (block 902). SMC 132 determines whether a system register reset request 216 was received (decision block 904). If a system register reset request 216 was not received, method 900 ends. If a system register reset request 216 was received, SMC 132 identifies a default system register configuration from a database of valid configurations (block 906). SMC 132 reads a default value from the default system register configuration (block 908). SMC 132 writes the default value to the corresponding system register (block 910). SMC 132 determines whether all default values from the default system register configuration have been written to the corresponding system registers (decision block 912). If all default values from the default system register configuration have been written to the corresponding system registers, method 900 ends. If not all default values from the default system register configurations have been written to the corresponding system registers, method 900 proceeds back to block 908.

Figure 10:
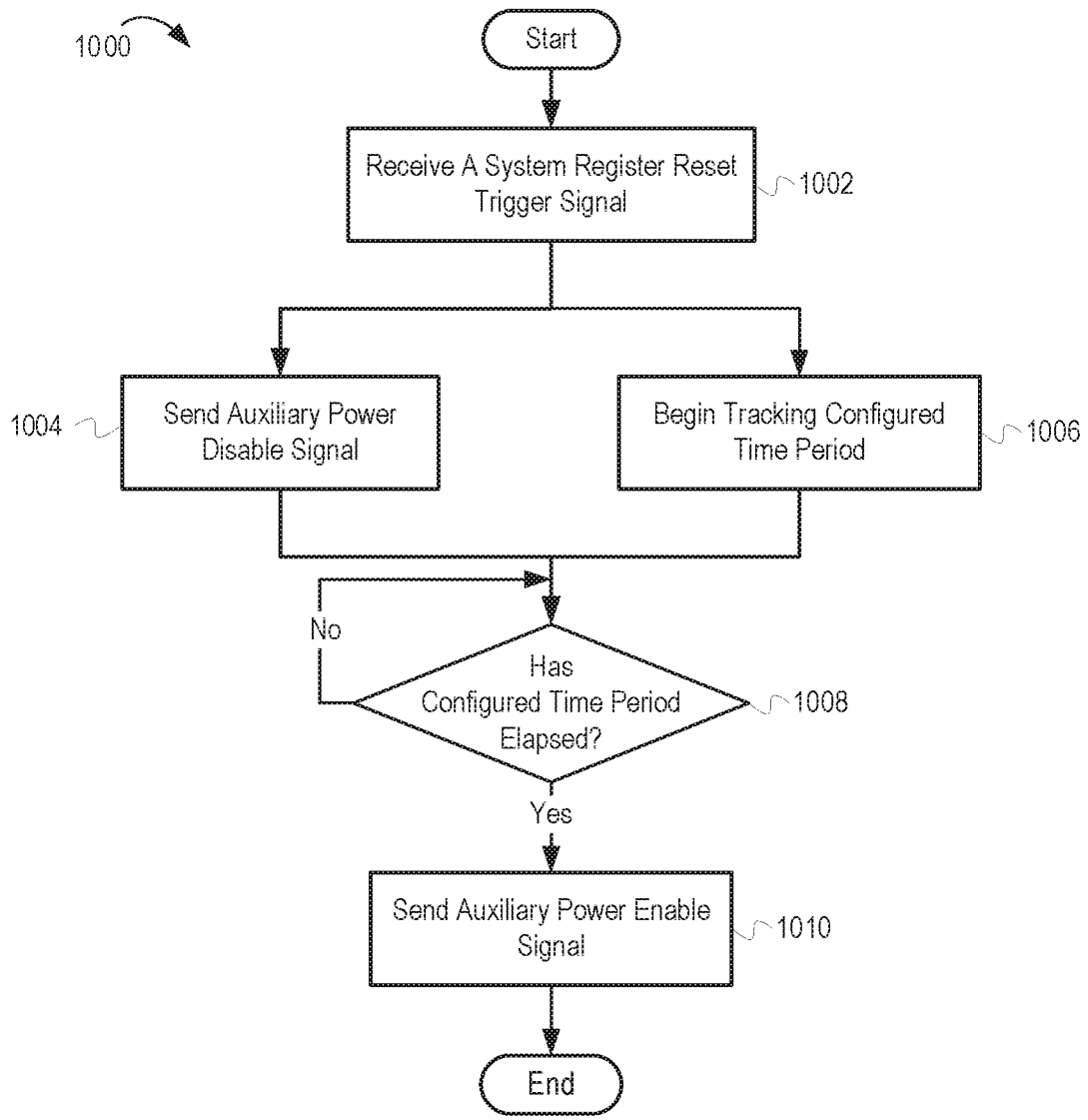
FIG. 10 illustrates a method of disabling auxiliary power for a configured time period, according to one or more embodiments.

FIG. 10 illustrates a method 1000 of disabling auxiliary power for a configured time period, according to one or more embodiments. Method 1000 begins when auxiliary power control timer 204 receives a system register reset trigger signal 218 (block 1002). In response to receiving the system register reset trigger signal 218, auxiliary power control timer 204 sends an auxiliary power disable signal to auxiliary power source 136 (block 1004). Also in response to receiving the system register reset trigger signal 218, auxiliary power control timer 204 begins tracking a configured time period (block 1006). While tracking the configured time period, auxiliary power control timer 204 determines whether the configured time period has elapsed (decision block 1008). If the configured time period has not elapsed, the auxiliary power control timer 204 continues tracking the configured time period. If the configured time period has elapsed, auxiliary power controller timer 204 sends an auxiliary power enable signal 214 to auxiliary power source 136 (block 1010). Then method 1000 ends.

Figure 11:
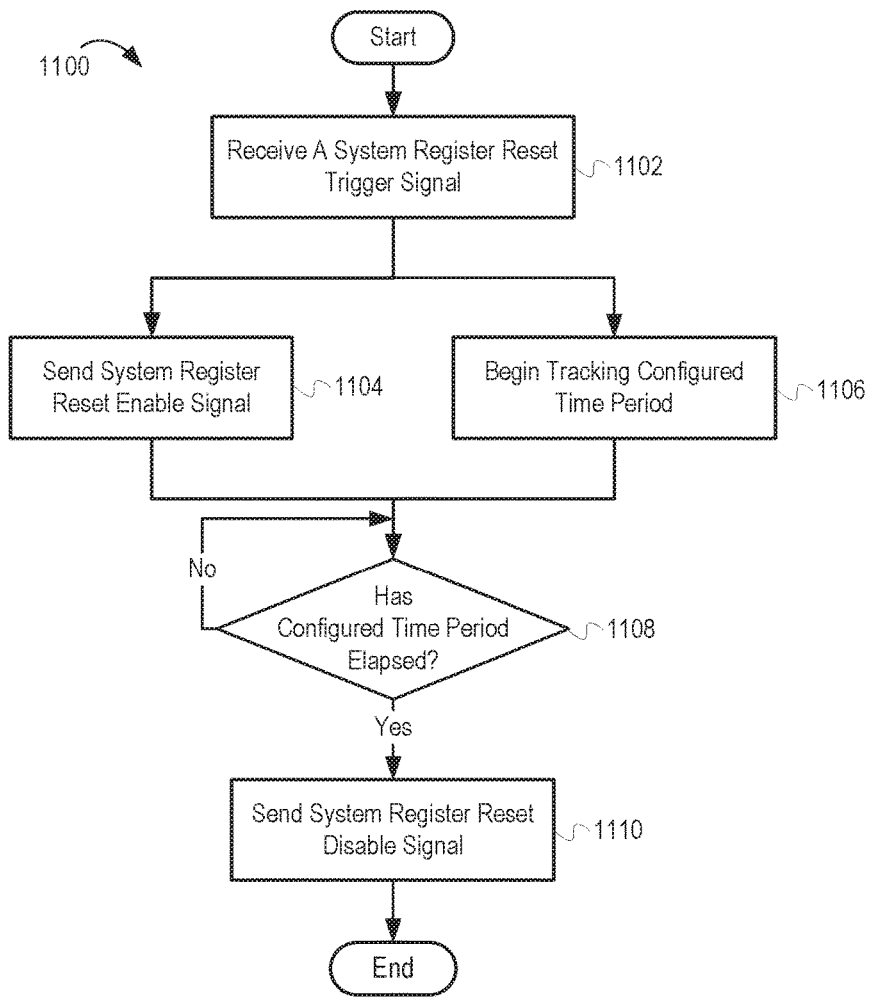
FIG. 11 illustrates a method of enabling a system register reset, according to one or more embodiments.

FIG. 11 illustrates a method 1100 of enabling a system register reset, according to one or more embodiments. Method 1100 begins when register reset timer 206 receives a system register reset trigger signal 218 (block 1102). In response to receiving the system register reset trigger signal 218, register reset timer 206 sends a system register reset enable signal 220 to register reset controller 208 (block 1104). Also in response to receiving the system register reset trigger signal 218, register reset timer 206 begins tracking a configured time period (block 1106). While tracking the configured time period, register reset timer 206 determines whether the configured time period has elapsed (decision block 1108). If the configured time period has not elapsed, the register reset timer 206 continues tracking the configured time period. If the configured time period has elapsed, register reset timer 206 sends a system register reset disable signal (block 1110). Then method 1100 ends.

Figure 12:
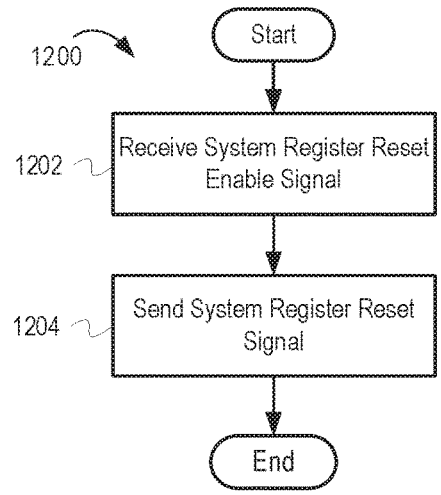
FIG. 12 illustrates a method of sending a system register reset signal, according to one or more embodiments.

FIG. 12 illustrates a method 1200 of sending a system register reset signal 222, according to one or more embodiments. Method 1200 begins when register reset controller 208 receives a register reset enable signal (block 1202). In response to receiving the register reset enable signal, register reset controller 208 sends a system register reset signal 222 to platform controller hub 138 (block 1204). Then method 1200 ends.

In the above described flow charts, one or more of the methods may be embodied in a computer readable medium containing computer readable code such that a series of functional processes are performed when the computer readable code is executed on a computing device. In some implementations, certain steps of the methods are combined, performed simultaneously or in a different order, or perhaps omitted, without deviating from the scope of the disclosure. Thus, while the method blocks are described and illustrated in a particular sequence, use of a specific sequence of functional processes represented by the blocks is not meant to imply any limitations on the disclosure. Changes may be made with regards to the sequence of processes without departing from the scope of the present disclosure. Use of a particular sequence is therefore, not to be taken in a limiting sense, and the scope of the present disclosure is defined only by the appended claims.

As described herein, a particular signal may be put in a logic high state (asserted) or in a logic low state (deasserted). If the particular signal is a signal to enable a component (e.g., the auxiliary power enable signal 214) and the signal is in a logic high state, the signal may be referred to as an enable signal (e.g., auxiliary power enable signal 214). If the particular signal is in a logic low state, the signal may be referred to as a disable signal (e.g., auxiliary power disable signal). In some implementations, the connections between components used to send a signal may comprise multiple connections. For example, the auxiliary power enable signal 214 may include a connection for the auxiliary power enable signal 214 and a connection for the auxiliary power disable signal. Further, the signals may be sent via a bus (e.g., a system bus), which may utilize other techniques to encode and send the signals via the bus.

As noted above, transistors 302, 304, and 404, act as switches. As such, any circuit or component that functions as a switch can be used in place of one or more of transistors 302, 304, and 404. Additionally, transistor 306 functions as an inverter. As such, any circuit or component that functions as an inverter can be used in place of transistor 306.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. Computer program code for carrying out operations for aspects of the present disclosure may be written in any combination of one or more programming languages, including an object-oriented programming language, without limitation. These computer program instructions may be provided to a processor of a general-purpose computer, special purpose computer, such as a service processor, or other programmable data processing apparatus to produce a machine, such that the instructions, which execute via the processor of the computer or other programmable data processing apparatus, performs the method for implementing the functions/acts specified in the flowchart and/or block diagram block or blocks.

One or more of the embodiments of the disclosure described can be implementable, at least in part, using a software-controlled programmable processing device, such as a microprocessor, digital signal processor or other processing device, data processing apparatus or system. Thus, it is appreciated that a computer program for configuring a programmable device, apparatus or system to implement the foregoing described methods is envisaged as an aspect of the present disclosure. The computer program may be embodied as source code or undergo compilation for implementation on a processing device, apparatus, or system. Suitably, the computer program is stored on a carrier device in machine or device readable form, for example in solid-state memory, magnetic memory such as disk or tape, optically or magneto-optically readable memory such as compact disk or digital versatile disk, flash memory, etc. The processing device, apparatus or system utilizes the program or a part thereof to configure the processing device, apparatus, or system for operation.

As will be further appreciated, the processes in embodiments of the present disclosure may be implemented using any combination of software, firmware or hardware. Accordingly, aspects of the present disclosure may take the form of an entirely hardware embodiment or an embodiment combining software (including firmware, resident software, micro-code, etc.) and hardware aspects that may all generally be referred to herein as a "circuit," "module," or "system." Furthermore, aspects of the present disclosure may take the form of a computer program product embodied in one or more computer readable storage device(s) having computer readable program code embodied thereon. Any combination of one or more computer readable storage device(s) may be utilized. The computer readable storage device may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage device would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage device may be any tangible medium that can contain, or store a program for use by or in connection with an instruction execution system, apparatus, or device.

Where utilized herein, the terms "tangible" and "non-transitory" are intended to describe a computer-readable storage medium (or "memory") excluding propagating electromagnetic signals; but are not intended to otherwise limit the type of physical computer-readable storage device that is encompassed by the phrase "computer-readable medium" or memory. For instance, the terms "non-transitory computer readable medium" or "tangible memory" are intended to encompass types of storage devices that do not necessarily store information permanently, including, for example, RAM. Program instructions and data stored on a tangible computer-accessible storage medium in non-transitory form may afterwards be transmitted by transmission media or signals such as electrical, electromagnetic, or digital signals, which may be conveyed via a communication medium such as a network and/or a wireless link.

While the disclosure has been described with reference to exemplary embodiments, it will be understood by those skilled in the art that various changes may be made and equivalents may be substituted for elements thereof without departing from the scope of the disclosure. In addition, many modifications may be made to adapt a particular system, device or component thereof to the teachings of the disclosure without departing from the essential scope thereof. Therefore, it is intended that the disclosure not be limited to the particular embodiments disclosed for carrying out this disclosure, but that the disclosure will include all embodiments falling within the scope of the appended claims. Moreover, the use of the terms first, second, etc. do not denote any order or importance, but rather the terms first, second, etc. are used to distinguish one element from another.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The description of the present disclosure has been presented for purposes of illustration and description, but is not intended to be exhaustive or limited to the disclosure in the form disclosed. Many modifications and variations will be apparent to those of ordinary skill in the art without departing from the scope of the disclosure. The described embodiments were chosen and described in order to best explain the principles of the disclosure and the practical application, and to enable others of ordinary skill in the art to understand the disclosure for various embodiments with various modifications as are suited to the particular use contemplated.

What is claimed is:

1. A method for resetting one or more system registers of an information handling system (IHS), the method comprising:
    receiving, by an IHS, a system register reset request;
    in response to receiving the system register reset request:
        sending, to an auxiliary power source, an auxiliary power disable signal; and
        sending, to a register reset controller, a system register reset enable signal;
    in response to receiving the auxiliary power disable signal, disabling, by the auxiliary power source, an auxiliary power source output, wherein the auxiliary power source output provides primary power for one or more system registers;
    in response to receiving the system register reset enable signal, disabling, by the register reset controller, a system register power source, wherein the system register power source provides backup power for the one or more system registers; and
    in response to detecting that the auxiliary power source output and the system register power source are disabled, resetting the one or more system registers to one or more default values, wherein each of the default values corresponds to at least one system register of the one or more system registers.

2. The method of claim 1 further comprising:
    tracking an elapsed time following receipt of the system register reset request;
    in response to determining that a first time period has elapsed, enabling the system register power source; and
    in response to determining that a second time period has elapsed, enabling the auxiliary power source, wherein the second time period is longer than the first time period and the auxiliary power source is enabled after the system register power source.

3. The method of claim 1 further comprising:
    in response to receiving the system register reset request, reading a value from a system register of the one or more system registers;
    determining that the value matches at least one valid value from a set of valid values; and
    in response to determining that the value matches at least one valid value from the set of valid values, indicating that the system register of the one or more system registers was successfully reset.

4. The method of claim 1, wherein resetting the one or more system registers to one or more default values comprises:
    identifying a default system register configuration, wherein the default system register configuration comprises the one or more default values; and
    writing the one or more default values into the one or more system registers corresponding to the one or more default values.

5. The method of claim 4, wherein resetting the one or more system registers to one or more default values further comprises reading the one or more default values from the default system register configuration, wherein the one or more default values are associated with at least one of a real-time clock and power management settings.

6. The method of claim 1 further comprising:
in response to receiving the system register reset request, determining whether the IHS is in a first sleep state of a set of sleep states; and
in response to determining that the IHS is not in the first sleep state, performing one or more operations to put the IHS into the first sleep state.

7. The method of claim 1 further comprising:
in response to receiving the system register reset request:
reading real-time clock data from the one or more system registers; and
storing the real-time clock data in non-volatile memory; and
wherein said resetting the one or more system registers to one or more default values comprises:
reading the real-time clock data from the non-volatile memory; and
writing the real-time clock data to the one or more system registers.

8. The method of claim 1 further comprising receiving the system register reset request from a device communicatively coupled to the IHS via one or more networks.

9. An information handling system (IHS) comprising:
a first timing circuit configured to:
receive a system register reset trigger signal; and
in response to receiving the system register reset trigger signal, send an auxiliary power source disable signal to an auxiliary power source to temporarily disable the auxiliary power source;
a second timing circuit configured to:
receive the system register reset trigger signal; and
in response to receiving the system register reset trigger signal, send a system register reset enable signal to a register reset circuit;
the register reset circuit configured to:
receive the system register reset enable signal from the second timing circuit; and
in response to receiving the system register reset enable signal, send, to a first component, a system register reset signal to reset one or more system registers; and
the first component comprising the one or more system registers, the first component configured to:
receive the system register reset signal; and
in response to receiving the system register reset signal, reset the one or more system registers to a default state.

10. The IHS of claim 9, wherein the register reset circuit being configured to send the system register reset signal to the first component comprises the register reset circuit being configured to disable a system register power supply.

11. The IHS of claim 9, wherein:
the first timing circuit is further configured to:
determine that a first time period has elapsed after receiving the system register reset trigger signal; and
in response to determining that the first time period has elapsed, send an auxiliary power source enable signal to the auxiliary power source;
the second timing circuit is further configured to:
determine that a second time period has elapsed after receiving the system register reset trigger signal; and
in response to determining that the second time period has elapsed, send a register reset disable signal to the register reset circuit.

12. The IHS of claim 11, wherein the first time period is based, at least in part, on the length of the second time period, a minimum amount of time required for an auxiliary power rail to become stable after being enabled or disabled, and a chipset specification defining prerequisites for transitions between one or more power states.

13. The IHS of claim 9, further comprising:
a second component configured to:
receive a request to reset the one or more system registers;
in response to the request to reset the one or more system registers, determine that the IHS is not in a first power state of a set of power states;
in response to a determination that the IHS is not in the first power state, perform one or more operations to put the IHS in the first power state; and
after performing the one or more operations to put the IHS in the first power state, send the system register reset trigger signal to the first timing circuit and to the second timing circuit.

14. The IHS of claim 13, wherein the set of power states comprises one or more Advanced Configuration and Power Interface (ACPI) states and the first power state is the S5 state of the one or more ACPI states.

15. The IHS of claim 13, wherein the second component is further configured to:
in response to receiving the request to reset the one or more system registers, store an indication that the request to reset the one or more system registers was received;
during a subsequent boot process:
determine that the request to reset the one or more system registers was received based, at least in part, on the stored indication; and
in response to a determination that the request to reset the one or more system registers was received:
read, from non-volatile memory associated with the second component, one or more register values corresponding to the one or more system registers; and
write the one or more register values to the corresponding registers of the one or more system registers.

16. The IHS of claim 9, wherein:
the first timing circuit further comprises:
a first timer having an output coupled with the auxiliary power source; and
a first transistor, wherein a first transistor gate terminal is coupled with an input configured to receive the system register reset trigger signal, a first transistor drain terminal is coupled with a constant power source from the auxiliary power source and the first timer, and a first transistor source terminal is coupled to a ground;
the second timing circuit further comprises:
a second timer;
a second transistor, wherein a second transistor gate terminal is coupled with an input configured to receive the system register reset trigger signal, a second transistor drain terminal is coupled with the constant power source from the auxiliary power source and the second timer, and a second transistor source terminal is coupled to a ground; and
a third transistor, wherein a third transistor gate terminal is coupled with an output from the second timer, a third transistor drain terminal is coupled with the constant power source from the auxiliary power source and the register reset circuit, and a third transistor source terminal is coupled to a ground.

17. The IHS of claim 16, wherein the register reset circuit further comprises:

a fourth transistor, wherein a fourth transistor gate terminal is coupled with the third transistor drain terminal, a fourth transistor drain terminal is coupled with a system register power source and the first component, and a fourth transistor source terminal is coupled to a ground.

18. An information handling system (IHS) comprising:
a set of one or more system registers;
a timer; and
a controller communicatively coupled to the timer and having firmware executing thereon, wherein the firmware configures the controller to:
 receive a system register reset request; and
 in response to receiving the system register reset request, send a system register reset trigger signal to the timer;
wherein the timer is configured to:
 receive the system register reset trigger signal; and
 in response to receiving the register system reset trigger signal:
  send a first power source disable signal to a first power source; and
  send a second power source disable signal to a second power source, wherein disabling the first power source and the second power source resets the one or more system registers.

19. The IHS of claim 18, wherein the firmware further configures the controller to:
read first register data from the one or more system registers;
write the first register data to non-volatile memory; and
after the one or more system registers have been reset:
 read second register data from the one or more system registers;
 determine that second register data is valid; and
 in response to a determination that the second register data is valid, store an indication that resetting the one or more system registers was successful.

20. The IHS of claim 18, wherein the firmware further configures the controller to:
determine that the IHS has entered a boot process; and
in response to a determination that the IHS has entered the boot process,
 read one or more default values corresponding to the one or more system registers; and
 write the one or more default values to the corresponding one or more system registers.

* * * * *